United States Patent
Sato et al.

(10) Patent No.: US 9,116,321 B2
(45) Date of Patent: Aug. 25, 2015

(54) OPTICAL FIBER CORD

(71) Applicant: SUMITOMO ELECTRIC INDUSTRIES, LTD., Osaka-shi, Osaka (JP)

(72) Inventors: Fumiaki Sato, Yokohama (JP); Naomichi Osada, Yokohama (JP); Hiroshi Miyano, Yokohama (JP); Keisuke Okada, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/253,895

(22) Filed: Apr. 16, 2014

(65) Prior Publication Data

US 2014/0314382 A1 Oct. 23, 2014

(30) Foreign Application Priority Data

Apr. 18, 2013 (JP) .................................. 2013-087356

(51) Int. Cl.
*G02B 6/38* (2006.01)
*G02B 6/44* (2006.01)

(52) U.S. Cl.
CPC ............ *G02B 6/4403* (2013.01); *G02B 6/4434* (2013.01); *G02B 6/448* (2013.01); *G02B 6/4413* (2013.01); *Y10T 29/49826* (2015.01)

(58) Field of Classification Search
CPC .......... G02B 6/04; G02B 6/40; G02B 6/4403; G02B 6/448
USPC ...................................................... 385/77, 114
See application file for complete search history.

(56) References Cited

U.S. PATENT DOCUMENTS

| | | | | | |
|---|---|---|---|---|---|
| 4,885,663 | A | * | 12/1989 | Parker | ............................ 362/561 |
| 2009/0175583 | A1 | * | 7/2009 | Overton | ......................... 385/100 |

FOREIGN PATENT DOCUMENTS

| | | |
|---|---|---|
| JP | A-H11-038292 | 2/1999 |
| JP | A-2002-286980 | 10/2002 |
| JP | A-2007-279226 | 10/2007 |
| JP | A-2008-197622 | 8/2008 |
| JP | A-2008-241764 | 10/2008 |
| JP | A-2010-128069 | 6/2010 |
| JP | 2010-164887 A | 7/2010 |
| JP | A-2013-134457 | 7/2013 |
| WO | WO 2012/096246 A1 | 7/2012 |

* cited by examiner

*Primary Examiner* — Ryan Lepisto
(74) *Attorney, Agent, or Firm* — Drinker Biddle & Reath LLP

(57) ABSTRACT

An optical fiber cord includes an optical fiber cord main body with a round sectional form, the optical fiber cord main body including a core which has an optical fiber ribbon in which N (N is an even number of 4 or larger) coated optical fibers are arranged in parallel, and a sheath which covers the core. In the optical fiber ribbon, connected parts and non-connected parts are intermittently formed in a longitudinal direction between the adjacent coated optical fibers.

18 Claims, 9 Drawing Sheets

| TYPE OF CORD | CORD ACCOMMODATION PROPERTY | MPO CONNECTOR WORK TIME | SKEW (PROPAGATION TIME DIFFERENCE) |
|---|---|---|---|
| 12-FIBER SINGLE FIBER TYPE | ○ (20 SECONDS) | × (35 MINUTES) | × (1.4 ps/m) |
| 12-FIBER RIBBON TYPE | × (40 SECONDS) | ○ (15 MINUTES) | ○ (0.4 ps/m) |
| 12-FIBER INTERMITTENT RIBBON TYPE | ○ (21 SECONDS) | ○ (18 MINUTES) | ○ (0.38 ps/m) |

OPTICAL FIBER CORD

CROSS-REFERENCE TO RELATED APPLICATION(S)

The present application claims the benefit of priority of Japanese Patent Application No. 2013-087356 filed on Apr. 18, 2013. The disclosures of the application are incorporated herein by reference.

BACKGROUND

1. Technical Field

The present disclosure relates to an optical fiber cord having an optical fiber ribbon in which four or more coated optical fibers are arranged in parallel.

2. Related Art

In recent years, with the increase of capacity of data in a data center, a demand for an optical fiber cord with a multi-fiber connector is increased.

As a related-art optical fiber cord, a multi-fiber cord is used in which a plurality of coated optical fibers are accommodated individually (which is referred as a single fiber type multi-fiber cord). A terminal part of the single fiber type multi-fiber cord is connected to an MPO (Multi-fiber Push-on) connector having 12 fibers, 24 fibers or the like.

A multi-fiber cord is also used in which an optical fiber ribbon is accommodated in place of the coated optical fibers (which is referred as a ribbon type multi-fiber cord). A terminal part of the ribbon type multi-fiber cord is connected to an MPO connector having 12 fibers, 24 fibers or the like.

As one example of such a ribbon type multi-fiber cord, the patent literature 1 discloses a flat type optical fiber cord having one or a plurality of optical fiber ribbons and a sheath with a substantially rectangular form in section for accommodating the optical fiber ribbons, wherein thick parts that are formed to be thicker than other parts are provided in diagonal parts in an inside surface of the sheath.

LITERATURE OF RELATED ART

Patent Literature

[Patent Literature 1] JP-A-2010-164887

The related-art single fiber type optical fiber cord in which the plurality of coated optical fibers are accommodated individually has no directivity of bending. However, the single fiber type optical fiber cord requires much time and labor for a process (a connector work) to attach a connector, for instance, the plurality of coated optical fibers are ribbonized (so as to be partially integrated) when the optical fiber cord is connected to the connector. Further, since a length difference between the coated optical fibers causes a transmission time difference, the transmission time difference (skew) during a high speed parallel transmission is liable to be large.

On the other hand, the ribbon type optical fiber cord in which the optical fiber ribbon is accommodated, which is disclosed in the patent literature 1, is easier in the connector work than the single fiber type optical fiber cord and more hardly generate the skew. However, in the ribbon type optical fiber cord, a problem arises in view of handling ability that a directivity of bending occurs so that the ribbon type optical fiber cord is hardly bent in a direction of width of the optical fiber ribbon.

SUMMARY

Exemplary embodiments of the invention provide an optical fiber cord in which there is no directivity of bending, the connector work for attaching a multi-fiber connector is easy and the transmission time difference during the high speed parallel transmission can be reduced.

An optical fiber cord according to an exemplary embodiment of the invention, comprises:

an optical fiber cord main body with a round sectional form, the optical fiber cord main body including a core which has an optical fiber ribbon in which N (N is an even number of 4 or larger) coated optical fibers are arranged in parallel, and a sheath which covers the core, wherein in the optical fiber ribbon, connected parts and non-connected parts are intermittently formed in a longitudinal direction between the adjacent coated optical fibers.

The optical fiber cord may further include:

a multi-fiber connector connected to a terminal part of the optical fiber cord main body N may be an even number of 8 or larger and an outside diameter of the sheath may be 5.0 mm or smaller.

Transmission time differences between the coated optical fibers may be respectively 1.0 ps/m or lower.

The coated optical fiber may include a glass fiber and a fiber coating provided on the glass fiber, and a diameter of glass fiber may be substantially set to 125 μm and an outside diameter of fiber coating may be set to 190 μm or larger and 220 μm or smaller.

The optical fiber cord main body may have a tensile strength member, and the optical fiber ribbon may be arranged in the periphery of the tensile strength member.

The optical fiber ribbon may be spirally wound on the tensile strength member along the longitudinal direction of the tensile strength member.

A method of manufacturing an optical fiber cord according to an exemplary embodiment of the invention, comprises:

connecting a multi-fiber connector to a terminal part of an optical fiber cord main body with a round sectional form, wherein the optical fiber cord main body includes a core which has an optical fiber ribbon in which N (N is an even number of 4 or larger) coated optical fibers are arranged in parallel, and a sheath which covers the core, and the optical fiber ribbon has connected parts and non-connected parts intermittently formed in a longitudinal direction between the adjacent coated optical fibers.

According to the optical fiber cord of the invention, there is no directivity of bending as in the related-art ribbon type optical fiber cord, the connector work for attaching a multi-fiber connector is easy and the transmission time difference during the high speed parallel transmission can be reduced.

BRIEF DESCRIPTION OF THE DRAWINGS

FIG. 8 is a diagram showing results obtained by evaluating properties of the optical fiber cord according to the present invention and the related-art optical fiber cords.

DETAILED DESCRIPTION

Exemplary embodiments of an optical fiber cord according to the present invention will be described below by referring to the attached drawings.

Initially, by referring to FIG. 1A to FIG. 1C, one structural example of an optical fiber ribbon having an intermittent structure which is accommodated in the optical fiber cord according to the present invention will be described.

Figure 1A:
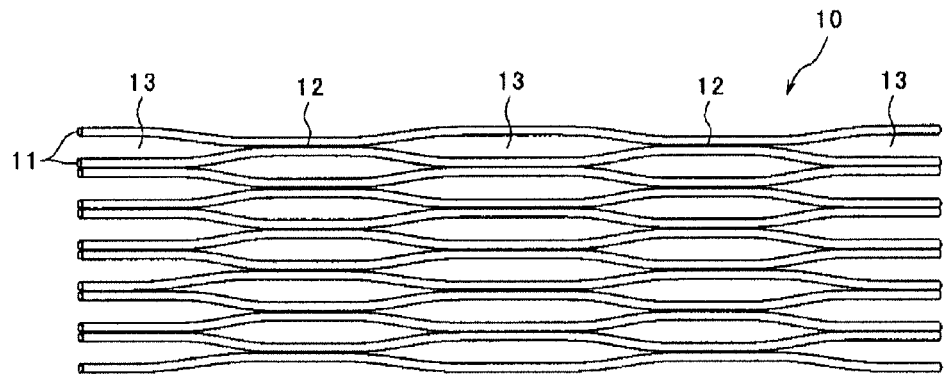
FIG. 1A is a diagram showing one structural example of an optical fiber ribbon having an intermittent structure accommodated in an optical fiber cord according to the present invention.

As illustrated in FIG. 1A, an optical fiber ribbon 10 has an intermittent structure in which connected parts 12 and non-connected parts 13 are intermittently formed in a longitudinal direction between adjacent coated optical fibers 11 (which is also referred as an intermittent optical fiber ribbon, hereinafter). The intermittent optical fiber ribbon 10 includes twelve coated optical fibers 11 (which is also referred as a 12-fiber intermittent optical fiber ribbon, hereinafter). Namely, in the 12-fiber intermittent optical fiber ribbon 10, the twelve coated optical fibers 11 are arranged in parallel (namely, arranged in parallel in one row) and the connected parts 12 and the non-connected parts 13 are intermittently formed in the longitudinal direction between the adjacent coated optical fibers 11.

FIG. 1A shows a state that the 12-fiber intermittent optical fiber ribbon 10 is expanded in a direction of width. FIG. 1B shows a state that the 12-fiber intermittent optical fiber ribbon 10 is closed in the direction of width. Further, FIG. 1C schematically shows a C-C section of the 12-fiber intermittent optical fiber ribbon 10 under a state shown in FIG. 1B.

In the 12-fiber intermittent optical fiber ribbon 10, a length formed by one connected part 12 and one non-connected part 13 (namely, a pitch of an intermittence) is set to, for instance, 100 mm. A width of the optical fiber ribbon is set to, for instance, 3 mm. Further, in this embodiment, in the 12-fiber intermittent optical fiber ribbon 10, a part, in which the connected part 12 and the non-connected part 13 are alternately arranged in the direction of width, and a part, in which only the non-connected part 13 is arranged in the direction of width, alternately appear in the longitudinal direction. However, a pattern of the arrangement of the connected parts 12 and the non-connected parts 13 is not limited to the above-described example.

Figure 1B:
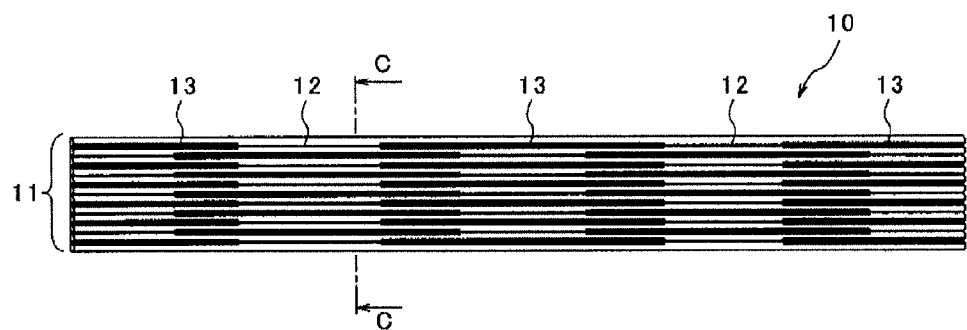
FIG. 1B is a diagram showing a state that the optical fiber ribbon shown in FIG. 1A is closed in a direction of width.
Figure 1C:
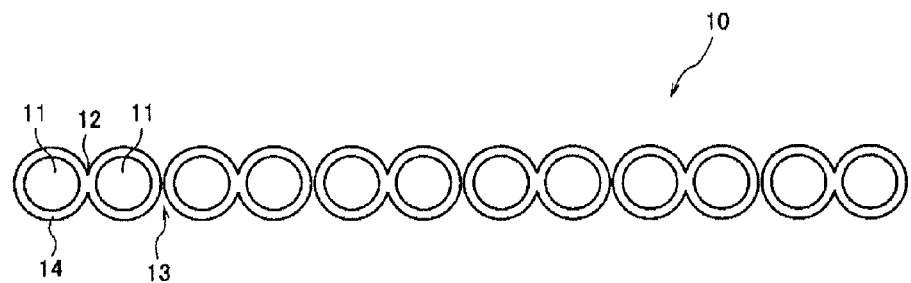
FIG. 1C is a diagram showing a section vertical to a longitudinal direction of the optical fiber ribbon shown in FIG. 1B.

As shown in FIG. 1C, in the periphery of the coated optical fiber 11, a ribbon coating 14 made of ultraviolet curable resin is formed. In the connected part 12, the ribbon coatings 14 of the adjacent coated optical fibers 11 are continuously formed. Further, in the non-connected part 13, the ribbon coatings 14 of the adjacent coated optical fibers 11 are not connected to separate single fibers from each other. In FIG. 1C, an example is shown in which the ribbon coating 14 is applied to the periphery of the coated optical fiber 11 in the non-connected part 13. However, the present invention is not limited to the example, and the ribbon coating 14 is not applied in the non-connected part 13 and the coated optical fibers 11 may be connected together by the resin as the ribbon coatings 14 only in the connected part 12.

Here, the coated optical fiber 11 is a single optical fiber including an optical fiber in which a fiber coating is provided on a glass fiber, or a colored optical fiber in which a colored layer is further provided on an outer surface of the fiber coating provided on the glass fiber.

In the coated optical fiber 11, a diameter of the glass fiber is preferably substantially set to 125 µm. An outside diameter of the coating (the fiber coating) of the coated optical fiber except a ribbon coating layer in the optical fiber ribbon 10, that is, an outside diameter of the coated optical fiber 11, is preferably set to 190 µm or larger and 220 µm or smaller. Thus, the diameter of the optical fiber cord can be thinned. However, the outside diameter of the coated optical fiber 11 is not limited to 200 µm or so. The coated optical fiber with the outside diameter of the other size may be used. For instance, the outside diameter of the coating of the coated optical fiber 11 may be 250 µm or so.

Figure 2:
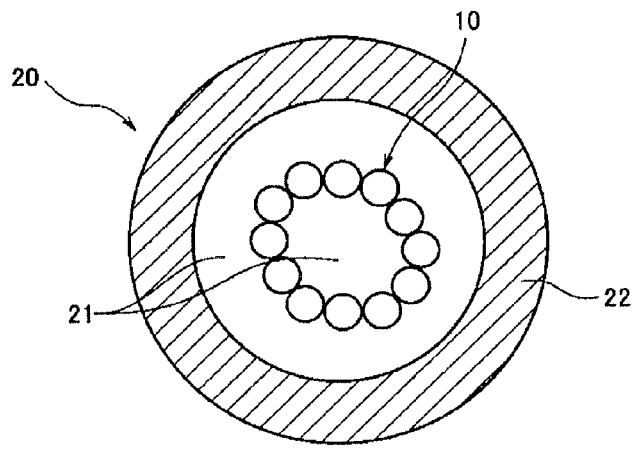
FIG. 2 is a sectional view showing one structural example of the optical fiber cord according to the present invention.
Figure 3:
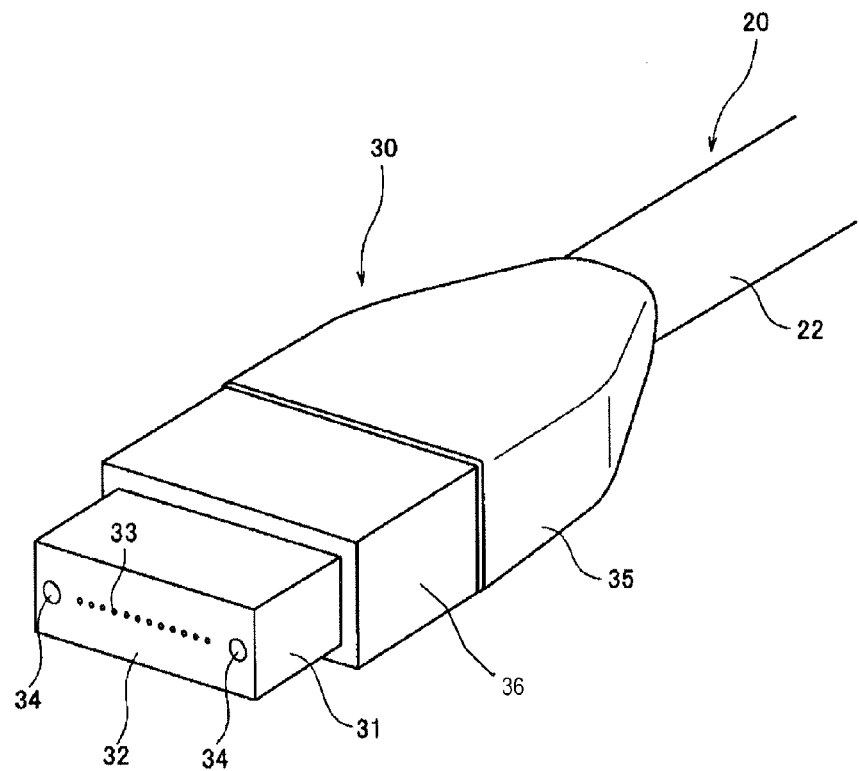
FIG. 3 is a perspective view showing one structural example of the optical fiber cord according to the present invention.

FIG. 2 and FIG. 3 are views showing one structural example of an optical fiber cord according to the present invention. FIG. 2 is a sectional view in a cord part vertical to a longitudinal direction. FIG. 3 is a perspective view of a terminal part of the cord.

As illustrated in FIG. 2, the optical fiber cord according to the present invention is a round (a sectional form is round) cord having a core, which includes the optical fiber ribbon 10 illustrated in FIG. 1A to FIG. 1C and a tensile strength member 21, and a sheath 22, which covers the core. A multi-fiber connector 30 is connected to a terminal part of the optical fiber cord as illustrated in FIG. 3. Here, the number of coated optical fibers in the intermittence optical fiber ribbon is not limited to twelve if the number (set to N) of the coated optical fibers 11 is set to an even number of 4 or larger.

For instance, as shown in FIG. 2, the core is be formed in such a way that the 12-fiber intermittent optical fiber ribbon 10 is rounded in the periphery of the tensile strength member 21 formed with aramid fibers and the tensile strength member 21 similarly formed with the aramid fibers is formed so as to surround the optical fiber ribbon 10. The core is not limited to this structure if the core has the tensile strength member and the optical fiber ribbon. The optical fiber ribbon 10 does not need to be provided so that the optical fiber ribbon 10 has a circle form in section as illustrated in FIG. 2. The optical fiber ribbon 10 can be folded so as to have an arbitrary form in its sectional form. The sheath 22 may be any member with which an outside of the core can be covered so that the sectional form of the cord is round. For instance, the sheath may be formed with PVC (polyvinyl chloride).

Figure 9:
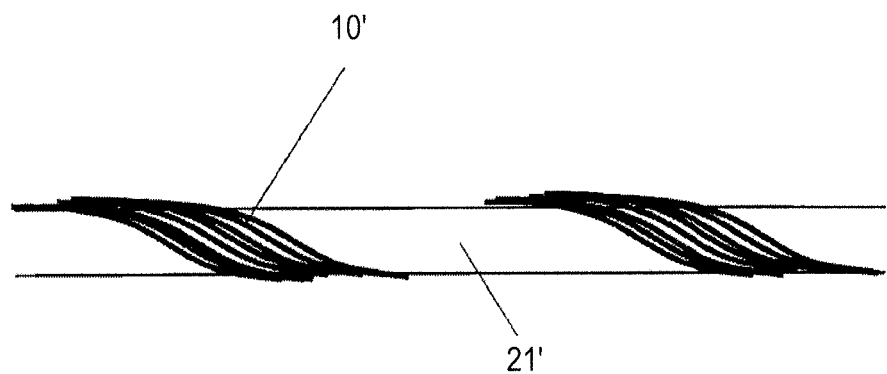
FIG. 9 is a schematic view showing another structural example of an optical fiber cord according to the present invention.

Further, as illustrated in FIG. 9, an optical fiber ribbon 10' may be spirally wound on a tensile strength member 21' along a longitudinal direction of the tensile strength member 21'. If the optical fiber ribbon is inserted into the sheath in a straight form (without being spirally wound) to form the cord, the transmission loss may be increased when the cord is bent. However, by inserting the optical fiber ribbon 10' into the sheath 22 by spirally winding the optical fiber ribbon 10' around the sheath 22, it is possible to prevent the transmission loss from being increased when the cord is bent.

As illustrated in FIG. 3, to at least one terminal part of an optical fiber cord main body (the cord part) 20 to which the sheath 22 is applied, the multi-fiber connector (a multi-fiber type optical connector) 30 is connected.

The multi-fiber connector 30 illustrated in FIG. 3 is a 12-fiber MPO connector having an MT connector as a base structure. The multi-fiber connector 30 includes a ferrule member 31, a housing 36 and a boot part 35. The boot part 35 is formed with an elastic member which protects the optical fiber cord main body 20.

In a front surface 32 of the ferrule member 31, fiber holes 33 are formed which are arranged at prescribed pitches. A plurality of short coated optical fibers (not shown in the drawing) to be respectively fusion-spliced to the coated optical fibers 11 are inserted into the fiber holes 33 and end parts thereof are exposed from the fiber holes 33. For instance, in the case of a 24-fiber optical fiber ribbon, a 24-fiber MPO connector formed with a two-stage arrangement can be used.

Further, guide holes 34 are formed at both sides of the fiber holes 33 in the front surface 32 of the ferrule member 31. The guide holes 34 are used for positioning a mate side connector. To the guide holes 34, guide pins (not shown in the drawing) of the mate side connector are inserted to connect the connector to the mate side connector so that connecting positions between the connectors may be allowed to accurately correspond to each other. The front surface 32 of the ferrule member 31 may be obliquely polished under a state that the coated optical fibers are inserted and fixed to the fiber holes 33. Thus, in the ends of the coated optical fibers, prescribed inclined surfaces are formed, so that a reflection of a signal light can be suppressed.

In the optical fiber cord of the present invention, since the sectional form thereof is round, the cord itself can ensure the same handling ability as that of a single-fiber type optical fiber cord. Further, since the intermittent optical fiber ribbon has an excellent deformability, a distortion in bending is reduced during a bending operation of a small diameter after the cord is formed and thus, there is no directivity of bending as in the related-art ribbon type optical fiber cord. Accordingly, much time is not taken until the optical fiber cord is accommodated in a termination box.

Further, according to the optical fiber cord of the present invention, since the optical fiber ribbon is used, the transmission time difference during the high speed parallel transmission can be reduced. Further, a connector work for attaching the multi-fiber connector can be easily carried out by arranging the optical fiber ribbon to make one straight line in the direction of width so as to be fusion-spliced together to the coated optical fibers fixed in the ferrule member. In such a way, in the optical fiber cord according to the present invention, not only a low skew can be realized, but also an accommodation property of the optical fiber ribbon and connector workability can be compatible with each other.

Further, the number N of the coated optical fibers 11 is preferably set to an even number of 8 or larger. In that case, an outside diameter of the sheath (namely, the outside diameter of the optical fiber cord) is preferably set to 5.0 mm or smaller. Thus, the multi-fiber optical fiber cord having a small diameter can be provided.

Further, the optical fiber cord is preferably manufactured so that the transmission time difference between the coated optical fibers 11 respectively may be set to 1.0 ps/m or lower, which substantially has no problem.

Now, a method of manufacturing the intermittent optical fiber ribbon such as the intermittent optical fiber ribbon 10 which is described in FIG. 1A will be described below. For the intermittent optical fiber ribbon, various forms and manufacturing methods are proposed so far. For instance, a first method is a method that connected parts to which an adhesive resin or a coating resin is applied by prescribed lengths in a longitudinal direction between adjacent coated optical fibers and non-connected parts to which the adhesive resin or the coating resin is not applied by prescribed lengths are alternately formed. A second method is a method that a ultraviolet curable resin is applied to entire lengths of a plurality of coated optical fibers, and then, ultraviolet rays (UV) are intermittently applied in a longitudinal direction to alternately form cured parts of the ultraviolet curable resin (connected parts) and uncured parts (non-connected parts). Further, a third method is a method that an optical fiber ribbon is initially formed with a common ribbon coating and slits are formed in a longitudinal direction of the common ribbon coating by a cutter edge to alternately form connected parts and non-connected parts.

As the method of manufacturing the intermittent optical fiber ribbon of the present invention, any of the first to the third methods may be used. In a description mentioned below, as one example of the method of manufacturing the optical fiber ribbon 10 shown in FIG. 1A to FIG. 1C, an example using the third method will be specifically described by referring to FIG. 4 to FIG. 7B.

Figure 4:
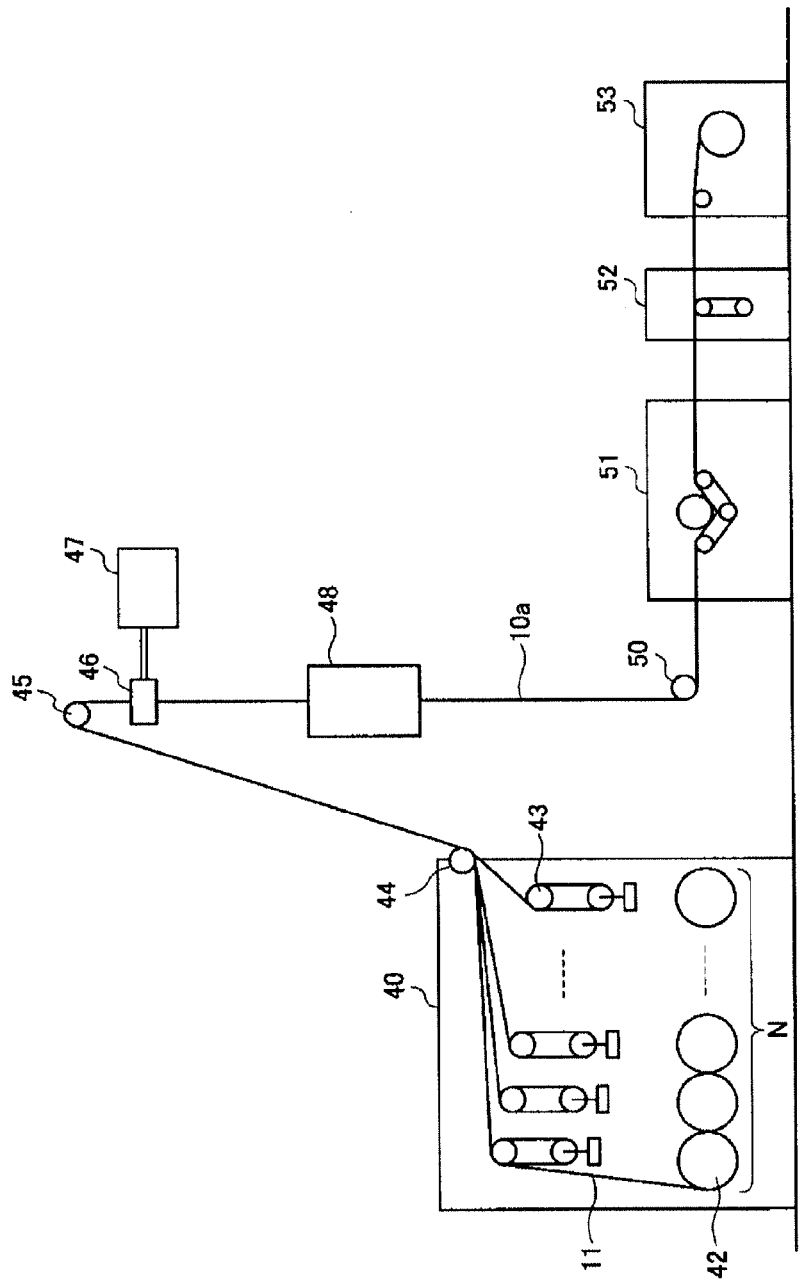
FIG. 4 is a diagram showing one structural example of a device which manufactures the optical fiber ribbon before an intermittent work is applied thereto.
Figure 5A:
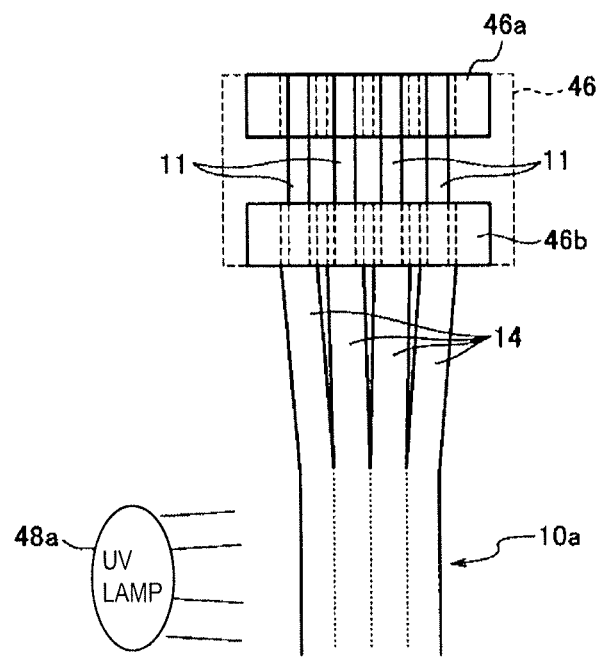
FIG. 5A is a schematic view for explaining a detail (a ribbon resin coating method) of a manufacturing method performed by the device shown in FIG. 4.
Figure 5B:
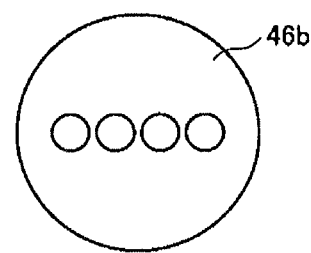
FIG. 5B is a diagram showing one example of a die used in the ribbon resin coating method in FIG. 5A.

Initially, will be described a method for manufacturing the optical fiber ribbon to which the common ribbon coating is applied before an intermittent work is carried out. FIG. 4 is a diagram showing one structural example of a device which manufactures the optical fiber ribbon before the intermittent work is applied thereto. Further, FIG. 5A is a schematic view for explaining a detail (a ribbon resin coating method) of the manufacturing method performed by the device shown in FIG. 4. FIG. 5B is a diagram showing one example of a die used in the method.

As shown in FIG. 4, in a supply device 40, N reels 42, N dancer rollers 43 and a guide roller 44 are provided. N indicates the number of coated optical fibers of the optical fiber ribbon 10. On the reels 42, the coated optical fibers 11 are respectively wound.

The coated optical fibers 11 are respectively supplied from the reels 42 and the dancer rollers 43 respectively apply a tension of several ten gf thereto. When the coated optical fibers 11 pass the guide roller 44, the coated optical fibers are arranged on one arrangement surface. Further, the coated optical fibers are further collected by an overhead guide roller 45 and fed to an applicator 46.

To the applicator 46, a nipple 46a and a die 46b as shown in FIG. 5A and FIG. 5B are attached. The nipple 46a has elliptical spout holes. In the die 46b, holes through which the N (here, an example of four fibers is exemplified for simplification) coated optical fibers respectively pass are provided so as to be spaced from one another so that the ultraviolet curable resin is applied to each of the coated optical fibers 11. The diameter of the hole of the die 46b may be determined so as to meet the thickness of optical fiber ribbon.

The coated optical fibers 11 are fed to and passed through the applicator 46 and pulled by a prescribed tension in a subsequent stage. Thus, the fed and passed coated optical fibers 11 are guided by the nipple 46a to have a desired arrangement and fed to the die 46b under a state that the fiber coatings are exposed. Then, the ultraviolet curable resin as the ribbon coatings 14 is applied to the peripheries of the coated optical fibers 11. The ultraviolet curable resin is supplied by a pressurized resin tank 47. Under a state that the ultraviolet curable resin is applied to the peripheries of the coated optical fibers 11, the ribbon coatings 14 respectively applied to the coated optical fibers 11 are spaced from one another as shown in FIG. 5A.

In a die having one hole which is ordinarily used, coated optical fibers are coated with a ultraviolet curable resin under a state that the coated optical fibers are allowed to come into contact with one another by a tension applied to the fibers. However, by using the die 46b as shown in FIG. 5B, under a state that pitches between the coated optical fibers 11 are respectively expanded (for instance, under a state that the pitches are expanded to about 250 µm), namely, the ultraviolet curable resin can be applied to each of the fibers so as to prepare for a cutting operation to form the non-connected parts 13 in a subsequent stage.

Then, the N (four in this example) coated optical fibers to which the ultraviolet curable resin as the ribbon coatings 14 is applied are collected so that parts of the ribbon coatings 14 thereof are allowed to come into contact with one another immediately after the coated optical fibers are outputted from the die 46b. Then, in an ultraviolet ray applying device 48, ultraviolet rays are applied to the ultraviolet curable resin from a UV lamp 48a to cure the ultraviolet curable resin. The cured ultraviolet resin forms the ribbon coatings 14 to form an N-fiber optical fiber ribbon 10a.

The optical fiber ribbon 10a cured by applying the ultraviolet rays from the ultraviolet ray applying device 48 are further fed to a winding device 53 having a reel via a guide roller 50, a feed capstan 51 and a winding and tension control dancer roller 52. In the winding device 53, the optical fiber ribbon 10a is wound by the reel via a guide. At this time, a winding tension of an entire part of the optical fiber ribbon is set to, for instance, several ten gf to several hundred gf. To the coated optical fibers having the ribbon coatings 14 outputted from the die 46b, air is blown from a direction of an arrangement of the coated optical fibers before the ultraviolet rays are applied thereto by the ultraviolet ray applying device 48 and the coated optical fibers are pulled by a prescribed tension adjusted so as to effectively collect the coated optical fibers by the winding device 53. Thus, the coated optical fibers can be collected and the coated optical fibers having the ribbon coatings 14 can be allowed to come into contact with one another.

In such a way, the plurality of coated optical fibers 11, the outside diameters of which are respectively about 200 µm, are arranged in parallel, the pitches of centers of the adjacent coated optical fibers are adjusted to be set to, for instance, about 250 µm, and the coated optical fibers 11 are coated together with a ribbon resin. Thus, the optical fiber ribbon 10a is manufactured, which has the thickness of about 250 µm and has the common ribbon coating applied so as to provide dents between the fibers. When the thickness of the ribbon is set to about 250 µm as described above, if the ribbon coating 14 is taken into consideration, the outside diameter of the coated optical fiber 11 may need to be set to about 200 µm. Further, when a colored optical fiber is used to provide an identification property in the fiber, the coated optical fiber may be drawn so that the coating diameter (diameter of the fiber coating) of the coated optical fiber is about 200 µm, and then colored to manufacture the colored optical fiber having an outside diameter of about 205 µm, and the manufactured colored optical fiber may be wound on the reel 42.

Now, a method for carrying out the intermittent work to such an optical fiber ribbon 10a will be described below. As for the intermittent work, is exemplified a method that a ribbon resin is intermittently cured under a state that the ribbon resin is not yet cured or a method for inserting a cutting edge such as a cutter or a rotary edge. In the below-described explanation, by referring to FIG. 6A to 7B, only the method for inserting the rotary edge will be described. However, other method may be applied.

Figure 6A:
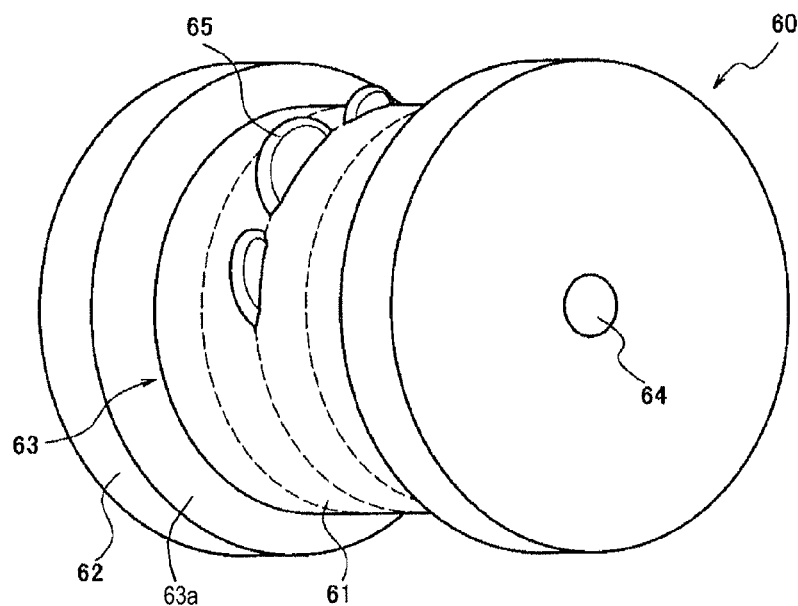
FIG. 6A is a schematic view for explaining one structural example of a cutting roller for the intermittent work.
Figure 6B:
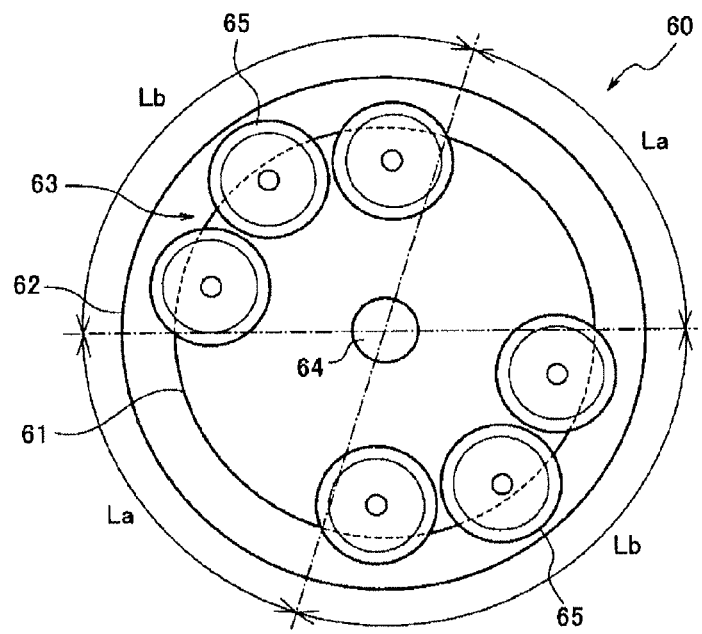
FIG. 6B is a sectional view vertical to an axial direction of the cutting roller shown in FIG. 6A.
Figure 7A:
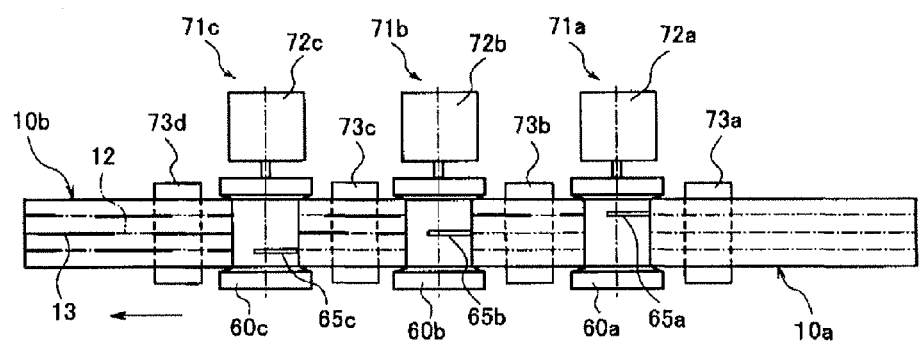
FIG. 7A is a top view showing one structural example of an intermittent working device.
Figure 7B:
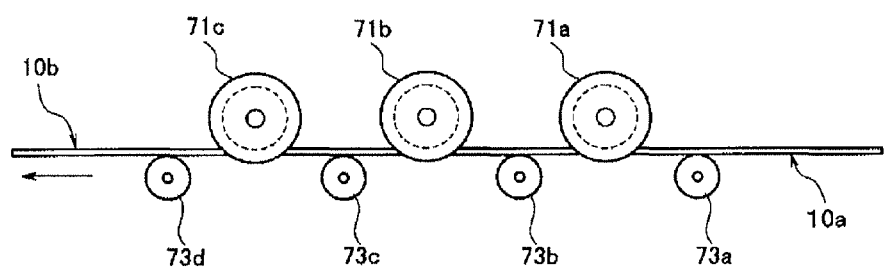
FIG. 7B is a side view showing the intermittent working device shown in FIG. 7A.

FIG. 6A is a schematic view for explaining one structural example of a cutting roller for the intermittent work. FIG. 6B is a sectional view vertical to an axial direction of the cutting roller shown in FIG. 6A. FIG. 7A is a top view showing one structural example of an intermittent working device. FIG. 7B is a side view of the intermittent working device.

As shown in FIG. 6A, the cutting roller 60 has a drum part 61 and collar parts 62 at both side parts of the drum part 61. In a circumferential area at a prescribed position in an axial direction on an outer peripheral surface of the drum part 61, disk shaped cutting edges 65 are arranged so as to protrude from the outer peripheral surface. The cutting roller 60 is supported so as to freely rotate on a roller shaft part 64 as a support shaft.

A guide groove 63 is formed by the collar parts 62 of the cutting roller 60. The guide groove 63 has a groove width corresponding to a width of the optical fiber ribbon (which is referred as ribbon width, hereinafter). The optical fiber ribbon 10a before an intermittent slit is formed is pressed and guided to move so that its surface comes into contact with the outer peripheral surface of the drum part 61 of the cutting roller 60. The optical fiber ribbon 10a is positioned by the guide groove 63 and runs and moves on the outer peripheral surface of the drum part 61. The groove width is preferably set to be larger than the ribbon width by a part corresponding to the thickness of the cutting edge 65. Otherwise, a wall surface of the guide groove 63 (a surface at the guide groove side of the collar part 62) is formed by an inclined surface 63a so as to permit the optical fiber ribbon 10a to protrude from the outer peripheral surface of the drum part 61.

The above-described prescribed position in the axial direction may be determined depending on which of boundaries between the adjacent coated optical fibers 11 the slit will be formed. In an example shown in FIG. 6A, the cutting edges 65 are arranged so as to form the slit in the boundary in an intermediate position in the direction of width of the optical fiber ribbon 10a.

As illustrated in FIG. 6A and FIG. 6B, a plurality of disk shaped cutting edges 65 are used and arranged so as to protrude in prescribed cutting areas Lb on the outer peripheral surface of the drum part 61 of the cutting roller 60. For instance, a diameter of the drum part 61 is supposed to be set to 63.7 mm, a circumferential length of the drum part 61 is 200 mm. Here, it is supposed that a rate of the length of the non-connected part (a slit part) 13 shown in FIG. 1 is set to 6 (for instance, 60 mm) and a rate of the length of the connected part (a non-slit part) 12 is set to 4 (for instance, 40 mm), the cutting edges 65 are arrange so that the cutting area Lb of the cutting roller 60 is 60 mm and a non-cutting area La is 40 mm. When a ratio of length of the non-cutting area La to the cutting area Lb is changed, the rate of length of the non-connected part 13 to the connected part 12 can be suitably changed.

As the cutting edge 65, for instance, three disk shaped cutting edges having diameters of 18 mm and thickness of 0.3 mm may be used in the cutting area Lb. The disk shaped edge has such advantages as to smoothly and easily enter the surface of the optical fiber ribbon, hardly generate cutting chips and be readily available since the disk shaped edge is marketed. The disk shaped cutting edge 65 is preferably detachably attached, exchangeable or changeable in its rotary position in arrangement to lengthen a life in use. Accordingly, the drum part 61 of the cutting roller 60 is formed with a disk shaped laminated body (which is made by laminating a plurality of disk shaped members) and the cutting edges 65 are held and fixed by sandwiching them between the adjacent disk shaped members.

As shown in FIG. 7A and FIG. 7B, the intermittent working device for carrying out the intermittent work has a slitting mechanism which forms the slit part in the optical fiber ribbon 10a to form the non-connected part 13 and obtain an intermittent optical fiber ribbon 10b.

The optical fiber ribbon 10a is supposed to move from a direction of the right to a direction of the left of a sheet surface shown in, for instance, FIG. 7A and FIG. 7B. To the optical fiber ribbon 10a, a plurality of slitting mechanisms 71a to 71c meeting the number of coated optical fibers (three slitting mechanisms when the number of coated optical fibers is four) are installed with their positions shifted in a direction of a production line (a longitudinal direction of the optical fiber ribbon).

The slitting mechanisms 71a to 71c rotate the cutting rollers 60a to 60c described in FIG. 6A and FIG. 6B by driving members 72a to 72c of driving motors and are controlled to a prescribed rotating speed in association with a moving speed of the optical fiber ribbon 10a. The cutting edges 65a to 65c of the cutting rollers 60a to 60c are arranged so that slit positions are different in the direction of width of the ribbon. The cutting rollers 60a to 60c respectively form intermittently slit parts only between the prescribed coated optical fibers to form the non-connected parts 13.

The cutting rollers 60a to 60c respectively come into contact with one surface of the optical fiber ribbon 10a to press the one surface and guide the movement of the optical fiber ribbon 10a. On an opposite surface of the optical fiber ribbon 10a, running rollers 73a to 73d are arranged so that the optical fiber ribbon 10a is not separated from the outer peripheral surfaces of the cutting rollers 60a to 60c. The running rollers 73a and 73d may have collar parts which suppress the movement of the optical fiber ribbon 10a in the direction of width. However, since the cutting rollers 60a to 60c have the positioning guide grooves, the collar parts do not need to be provided at the running rollers 73a and 73d.

The cutting rollers 60a to 60c are rotated, for instance, in a reverse direction to the moving direction of the optical fiber ribbon 10a. In this case, the cutting edges 65a to 65c move so as to slide on the optical fiber ribbon 10a and make slits in the optical fiber ribbon by circular arc shaped edges, so that the slit parts can be assuredly formed and cutting chips by the slit parts can be prevented from being generated. Further, the rotating speed (a moving speed) of the cutting edges 65a to 65c of the cutting rollers 60a to 60c is allowed to be different from the moving speed of the optical fiber ribbon 10a, so that the lengths of the connected part 12 and the non-connected part 13 can be changed while the rate of length of the non-connected part 13 to the connected part (the non-slit part) 12 is maintained to be the same.

Further, when the rotating direction of the cutting rollers 60a to 60c is allowed to be the same as the moving direction of the optical fiber ribbon 10a, the slit parts can be formed. Also in this case, the rotating speed (a moving speed) of the cutting edges 65a to 65c of the cutting rollers 60a to 60c is allowed to be different from the moving speed of the optical fiber ribbon 10a. Thus, the lengths of the connected part 12 and the non-connected part 13 can be changed while the rate of length of the non-connected part 13 to the connected part 12 is maintained to be the same. Further, when the rotating speed of the cutting edges 65a to 65c is made to be lower than the moving speed of the optical fiber ribbon 10a, the cutting edges 65a to 65c can move so as to slide on the optical fiber ribbon 10a and make slits in the optical fiber ribbon as described above. When the moving speed of the cutting edges 65a to 65c is the same as the moving speed of the optical fiber ribbon 10a and the moving directions of them are the same, the cutting edges are pushed in to the optical fiber ribbon 10a from a surface direction to make slits in the optical fiber ribbon, and thus, a slitting operation may be possibly insufficient.

As described above, the intermittent optical fiber ribbon 10b (that is, the intermittent optical fiber ribbon 10 as shown in FIG. 1A to FIG. 1C) is manufactured from the optical fiber ribbon 10a. The intermittent work of the optical fiber ribbon 10a may be carried out between the winding and tension control dancer roller 52 and the winding device 53 shown in FIG. 4.

Now, by referring to FIG. 8, results obtained by evaluating properties of the optical fiber cord of the present invention as described above will be described by comparing properties of two kinds of related-art optical fiber cords with those of the optical fiber cord of the present invention. FIG. 8 is a diagram showing a table of the results obtained by evaluating the properties of the cords of the optical fiber cord according to the present invention and the two kinds of related-art optical fiber cords.

For the two kinds of related-art optical fiber cords and the optical fiber cord of the present invention, in any of the optical fiber cords, the aramid fibers are used for the tensile strength member and PVC is used for the sheath. The 12-fiber optical fiber ribbon is used as the optical fiber ribbon to be accommodated to evaluate properties such as a cord accommodation property, a connector work time and a skew.

As for the cord accommodation property, a time is measured until the optical fiber cord is bundled with a diameter of 30 mm and accommodated in the termination box. When it takes 30 seconds or more, it is decided that the cord accommodation property of the optical fiber cord is bad. When it takes less than 30 seconds, it is decided that the cord accommodation property of the optical fiber cord is good. The connector work time indicates a time necessary for a 12-fiber MPO connector work for one terminal part of the cord. When it takes 30 minutes or more, it is decided that the connector work time is bad. When it takes less than 30 minutes, it is decided that the connector work time is good. Further, as for the skew, an MMF (Multimode Fiber) having the same refractive index of 50/125 µm is used as the coated optical fiber to obtain length differences of all the 12 fibers. When the length difference is 1.0 ps/m or higher, it is decided that the skew is bad. When the length difference is lower than 1.0 ps/m, it is decided that the skew is good (a low skew). In the table 80, when the evaluated result of any of the properties is bad (in the case of NG), "X" is displayed. When the evaluated result of the property is good, "O" is displayed.

In the properties of the related-art single fiber type optical fiber cord, as shown in the table 80, the cord accommodation property (20 seconds) is good, however, too much MPO connector work time is taken (35 minutes) and the skew has a value as high as 1.4 ps/m. Further, in the properties of the ribbon type optical fiber cord disclosed in the patent literature 1, as shown in the table 80, much MPO connector work time is not taken (15 minutes) and the skew has a value as low as 0.4 ps/m. However, the cord accommodation property is bad (40 seconds).

As compared therewith, in the optical fiber cord of the present invention, as shown in the table 80, the cord accommodation property is good (20 seconds), much MPO connector work time is not taken (18 minutes) and the skew has a value as low as 0.38 ps/m. As described above, it is understood that the optical fiber cord of the present invention satisfy any of the properties, namely, there is no directivity of bending, the connector work is easy and the skew can be reduced.

Now, a method for connecting a multi-fiber optical connector to an optical fiber cord main body to manufacture the optical fiber cord will be described below by referring to FIG. 10A to FIG. 10C. Below-described processes are carried out not in a factory, but in the place where the optical fiber cord is actually connected to the mate side connector.

Figure 10A:
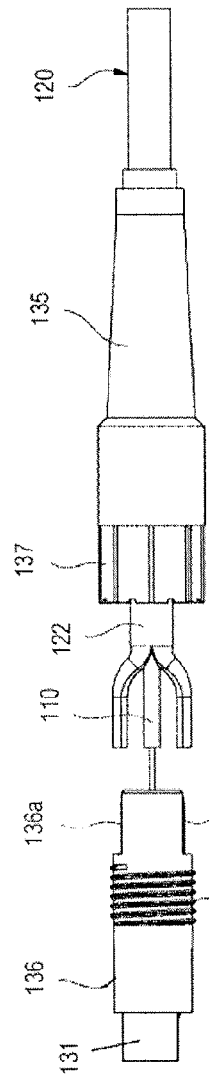
FIGS. 10A to 10C are diagrams for explaining a method of manufacturing the optical fiber cord according to the present invention.
Figure 10B:
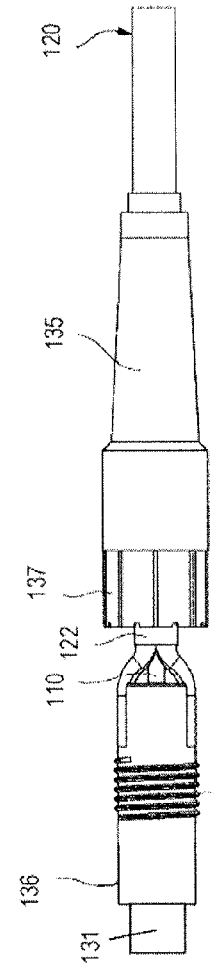
Figure 10C:
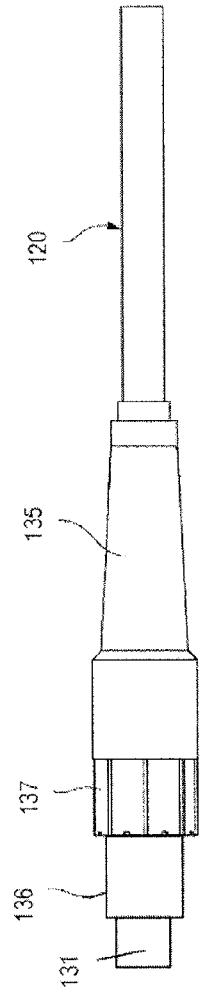

The multi-fiber connector shown in FIGS. 10A to 10C is different from the multi-fiber connector 30 shown in FIG. 3 in view of points that a fixing member 137 is provided and a housing 136 has a recessed part 136a and an external thread part 136b.

The fixing member 137 has a cylindrical form, and has an internal thread part (not shown in the drawing) in its inner peripheral surface. The internal thread part of the fixing member 137 is screwed to the external thread part 136b of the housing 136 so that the fixing member 137 is screwed to the housing 136. At that time, the fixing member 137 holds and fixes a sheath 122 and a tensile strength member of the optical fiber cord main body 120 between the housing 136 and the fixing member 137.

In the method for connecting the multi-fiber optical connector to the optical fiber cord main body, initially, a boot part 135, the fixing member 137 and the housing 136 are inserted to the optical fiber cord main body 120 in order.

Subsequently, the sheath 122 is torn and forked by a prescribed length from an end part of the optical fiber cord main body 120. Thus, the tensile strength member (not shown in the drawing) and an optical fiber ribbon 110 are exposed from the sheath 122. Then, a protective sleeve (not shown in the drawing) is inserted from an end part of the optical fiber ribbon 110.

Then, a ribbon coating and a fiber coating of the end part of the coated optical fiber 110 are removed to expose a glass fiber. After that, an end part of the glass fiber is cut by a fiber cutter. Then, the glass fiber and a short coated optical fiber held by a ferrule member 131 are fusion-spliced to each other by a fusion-splicing mechanism (not shown in the drawing).

Then, after the protective sleeve previously inserted to the optical fiber ribbon 110 is moved to the fusion-spliced part of the glass fiber and the short coated optical fiber, the protective sleeve is heated and shrunk. Thus, the fusion-spliced part is protected by the shrunk protective sleeve.

Subsequently, the housing 136 which is previously inserted to the optical fiber cord main body 120 is moved toward the protective sleeve side. Thus, as shown in FIG. 10A, the ferrule member 131 and the protective sleeve are accommodated in the housing 136.

Then, as shown in FIG. 10B, the forked parts of the sheath 122 are respectively mounted on the recessed part 136a of the housing 136 and the tensile strength member (not shown in FIG. 10A) of the optical fiber cord main body 120 is pulled out from the forked sheath 122 and mounted on the external thread part 136b of the housing 136.

Then, as shown in FIG. 10C, the fixing member 137 and the boot part 135 which are previously inserted to the optical fiber cord main body 120 are moved to screw the fixing member 137 to the housing 136. Thus, the sheath 122 and the tensile strength member of the optical fiber cord main body 120 are held and fixed by the housing 136 and the fixing member 137. In such a way, the multi-fiber optical connector 130 is connected to the optical fiber cord main body 120.

What is claimed is:

1. An optical fiber cord comprising:
    an optical fiber cord main body with a round sectional form, the optical fiber cord main body including a core which has an optical fiber ribbon in which N (N is an even number of 4 or larger) coated optical fibers are arranged, and a sheath which covers the core,
    wherein in the optical fiber ribbon, connected parts and non-connected parts are intermittently formed in a longitudinal direction between the adjacent coated optical fibers, the coated optical fibers that form the connected parts being arranged in parallel.

2. The optical fiber cord according to claim 1, further including:
    a multi-fiber connector connected to a terminal part of the optical fiber cord main body.

3. The optical fiber cord according to claim 2, wherein in the multi-fiber connector, the optical fiber ribbon is arranged to form a straight line in a direction of the width of the multi-fiber connector.

4. The optical fiber cord according to claim 1, wherein N is an even number of 8 or larger and an outside diameter of the sheath is 5.0 mm or smaller.

5. The optical fiber cord according to claim 1, wherein transmission time differences between the coated optical fibers are respectively 1.0 ps/m or lower.

6. The optical fiber cord according to claim 1, wherein the coated optical fiber includes a glass fiber and a fiber coating provided on the glass fiber, and a diameter of glass fiber is substantially set to 125 μm and an outside diameter of fiber coating is set to 190 or larger and 220 μm or smaller.

7. The optical fiber cord according to claim 1, wherein the optical fiber cord main body has a tensile strength member, and the optical fiber ribbon is arranged in the periphery of the tensile strength member.

8. The optical fiber cord according to claim 7, wherein the optical fiber ribbon is spirally wound on the tensile strength member along the longitudinal direction of the tensile strength member.

9. The optical fiber cord according to claim 1, wherein coatings of adjacent coated optical fibers that form connected parts of the optical fiber ribbon are continuously formed with each other, such that the adjacent coated optical fibers share the coating with each other.

10. The optical fiber cord according to claim 1, wherein the connected parts of the optical fiber ribbon are arranged to extend in parallel along a longitudinal axis of the optical fiber cord.

11. The optical fiber cord according to claim 1, wherein the optical fiber ribbon is arranged inside the sheath to have a circular cross-sectional arrangement around a longitudinal axis of the optical fiber cord.

12. The optical fiber cord according to claim 1, wherein the optical fiber ribbon is arranged inside the sheath to be folded to have an arbitrary cross-sectional arrangement seen in a direction of a longitudinal axis of the optical fiber cord.

13. A method of manufacturing an optical fiber cord comprising:
    connecting a multi-fiber connector to a terminal part of an optical fiber cord main body with a round sectional form,
    wherein the optical fiber cord main body includes a core which has an optical fiber ribbon in which N (N is an even number of 4 or larger) coated optical fibers are arranged in parallel, and a sheath which covers the core, and the optical fiber ribbon has connected parts and non-connected parts intermittently formed in a longitudinal direction between the adjacent coated optical fibers, the coated optical fibers that form the connected parts being arranged in parallel.

14. The method for manufacturing the optical fiber cord according to claim 13, wherein coatings of adjacent coated optical fibers that form connected parts of the optical fiber ribbon are continuously formed with each other, such that the adjacent coated optical fibers share the coating with each other.

15. The method for manufacturing the optical fiber cord according to claim 13, wherein the connected parts of the optical fiber ribbon are arranged to extend in parallel along a longitudinal axis of the optical fiber cord.

16. The method for manufacturing the optical fiber cord according to claim 13, wherein the optical fiber ribbon is arranged inside the sheath to have a circular cross-sectional arrangement around a longitudinal axis of the optical fiber cord.

17. The method for manufacturing the optical fiber cord according to claim 13, wherein the optical fiber ribbon is arranged inside the sheath to be folded to have an arbitrary cross-sectional arrangement seen in a direction of a longitudinal axis of the optical fiber cord.

18. The method for manufacturing the optical fiber cord according to claim 13, wherein in the multi-fiber connector, the optical fiber ribbon is arranged to form a straight line in a direction of the width of the multi-fiber connector.

\* \* \* \* \*